Figure 4:
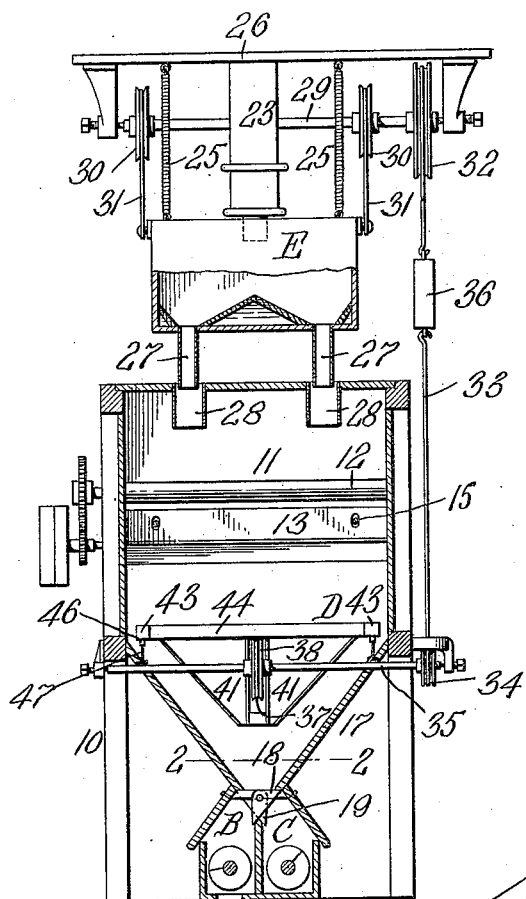

H. S. JEWELL.
METHOD OF AND APPARATUS FOR PURIFYING MIDDLINGS AND OTHER MATERIALS.
APPLICATION FILED AUG. 6, 1908.
934,668.
Patented Sept. 21, 1909.
2 SHEETS—SHEET 1.
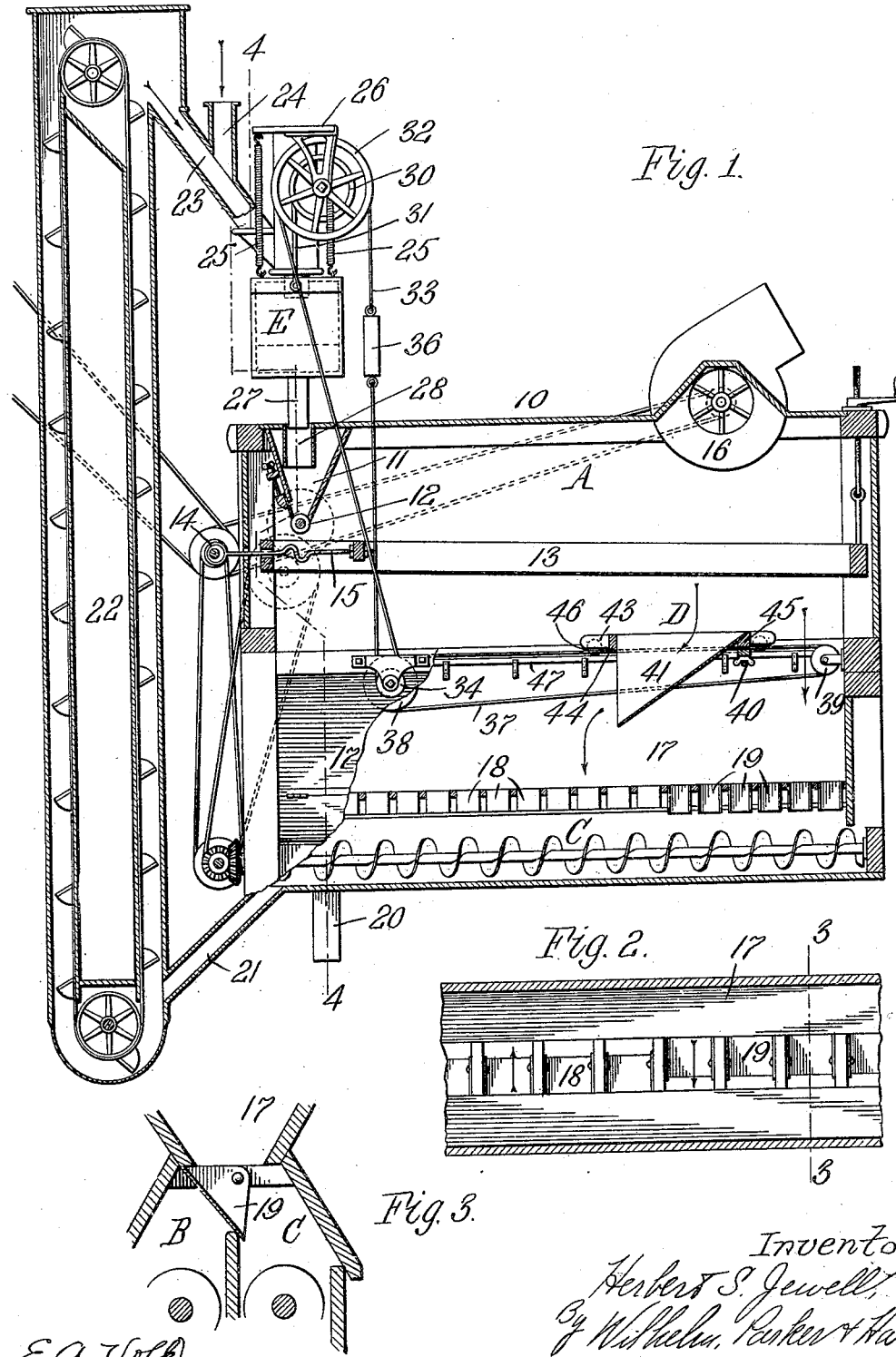
Witnesses:
E. A. Volk
C. B. Hornbeck
Inventor.
Herbert S. Jewell,
By Wilhelm, Parker & Hard,
Attorneys.

H. S. JEWELL.
METHOD OF AND APPARATUS FOR PURIFYING MIDDLINGS AND OTHER MATERIALS.
APPLICATION FILED AUG. 6, 1908.

934,668.

Patented Sept. 21, 1909.
2 SHEETS—SHEET 2.

Witnesses:
E. A. Volk.
C. B. Hornbeck

Inventor.
Herbert S. Jewell,
By Wilhelm, Parker & Hand,
Attorneys.

UNITED STATES PATENT OFFICE.

HERBERT S. JEWELL, OF BUFFALO, NEW YORK.

METHOD OF AND APPARATUS FOR PURIFYING MIDDLINGS AND OTHER MATERIALS.

934,668.

Specification of Letters Patent. Patented Sept. 21, 1909.

Application filed August 6, 1908. Serial No. 447,238.

*To all whom it may concern:*

Be it known that I, HERBERT S. JEWELL, a citizen of the United States, residing at Buffalo, in the county of Erie and State of New York, have invented a new and useful Improvement in Methods of and Apparatus for Purifying Middlings and other Materials, of which the following is a specification.
This invention relates to that class of purifying or separating operations and apparatus in which the material to be purified or separated is caused to flow over a sieve on which the purification or separation is effected.

In purifying middlings and other grain products it is particularly desirable that the layer of material on the sieve should be as uniform in thickness as possible, not only crosswise but also lengthwise of the sieve, because when the layer is uneven in thickness the purifying or separating air current, which flows upwardly through the sieve and carries off the light impurities, passes most readily through the thin portions of the layer of material and acts less upon the thicker portions, whereby the purification or separation is impaired and rendered uneven. In order to maintain a layer of uniform thickness on the sieve it is necessary to maintain a uniform feed of material to the sieve. The feed of fresh material to the sieve varies more or less from time to time and the feed can be kept uniform by properly augmenting the same as it falls below the normal feed to be maintained. In my Letters Patent No. 894,009, July 21, 1908, such an augmentation of the feed is effected automatically by returning to the feed mechanism purified or separated material in a quantity greater than necessary to supply any deficiency which may occur in the feed and adding automatically to the fresh feed from such returned material a sufficient quantity to supply the deficiency of the feed of fresh material, while the excess of such returned material, which is not required for maintaining a uniform load or layer on the sieve, is discharged through an overflow or bypass.

In the present invention the desired uniformity of the feed or load is obtained by returning automatically to the fresh feed such a portion of the material which has been purified or separated as is necessary to make up for the existing deficiency in the feed of fresh material, the quantity of returned material being variable and decreased or increased automatically as the feed of fresh material increases or decreases, and the aggregate of the fresh material plus the returned material being maintained automatically at a predetermined constant quantity suitable for furnishing a load or layer of the thickness desired to be maintained on the sieve, while the purified or separated material which is not required for the purpose of rendering the load uniform is discharged from the machine directly and without being returned.

Figure 5:
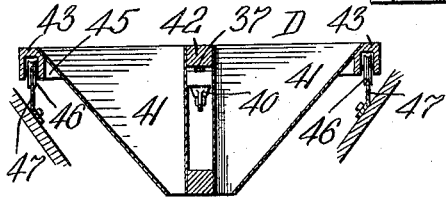
Figure 6:
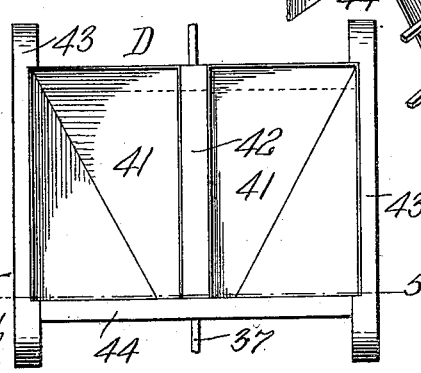
Figure 7:
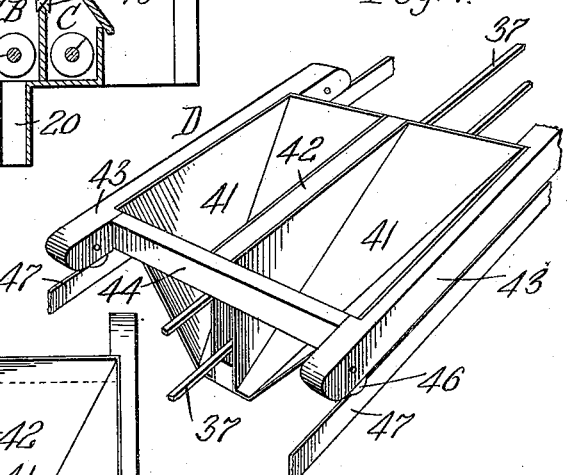

In the accompanying drawings, consisting of two sheets: Figure 1 is a longitudinal sectional elevation of a middlings purifier embodying this invention. Fig. 2 is a fragmentary horizontal section in line 2—2, Fig. 4, on an enlarged scale. Fig. 3 is a fragmentary vertical cross section in line 3—3, Fig. 2. Fig. 4 is a vertical transverse section in line 4—4, Fig. 1, looking rearward. Fig. 5 is a vertical transverse section through the automatic deflector or cutoff device in line 5—5, Fig. 6. Fig. 6 is a top plan view of the same. Fig. 7 is a perspective view of the same.

Like reference characters refer to like parts in the several figures.

A represents a middlings purifier of any suitable or well known construction comprising a casing 10, a feed hopper 11 provided with a feed roll 12, a shaking sieve 13 operated by an eccentric 14 and rod 15, a fan 16, a receiving hopper 17 arranged lengthwise underneath the sieve, a conveyer B for the purified material which is to be discharged, a conveyer C for the partially purified material which is to be returned, and manually adjustable cutoffs or deflectors 18, 19 whereby the material is directed from the hopper 17 to the conveyers. All of these parts may be of any ordinary or well known construction.

As shown in the drawings, Figs. 1–4, the cutoffs or deflectors are pivoted so that they can be adjusted by tilting them. The deflectors 18 in the front portion of the hopper are adjusted so as to deliver the material which passes through the front portion of the sieve into the conveyer B, which receives the purified material to be discharged from the machine and from which this material is delivered through a spout 20, while the deflectors 19 in the rear portion of the hopper are adjusted to deliver the material which passes through the rear portion of the sieve to the conveyer C which discharges the material through a spout 21 to a return elevator 22. The head of this elevator is provided with a discharge spout 23 with which connects a feed spout 24 for the fresh feed of material to be purified or separated.

D represents an automatic deflector or cut-off which is arranged underneath the sieve 13 and above the deflectors 18 and 19 and which is movable lengthwise of the sieve and so constructed that the material which falls upon this deflector or cutoff is deflected forwardly. This deflector stands normally with its rear portion over deflectors 19 and with its front portion over adjacent deflectors 18 and directs the material falling upon it forwardly to the deflectors 18 so as to pass to the conveyer B for the purified or separated material. The material which passes through the sieve 13 in rear of the automatic deflector or cutoff D drops upon the exposed rear deflectors 19 by which it is directed to the return conveyer C. By adjusting the automatic deflector D forwardly a greater number of the return deflectors 19 are uncovered and a correspondingly greater amount of material is directed to the return conveyer C, while by adjusting the automatic deflector rearwardly a correspondingly smaller number of return deflectors are uncovered and a correspondingly smaller amount of material is directed to the return conveyer. The forward and backward adjustment of the automatic deflector is effected by the feed mechanism in accordance with the quantity of fresh feed supplied to the machine. When the fresh feed decreases the automatic deflector is shifted forwardly so as to increase the amount of material which is returned in the same measure as the feed decreases, and when the fresh feed increases the automatic deflector is shifted rearwardly so as to decrease correspondingly the amount of material which is returned.

The automatic shifting of the deflector D is effected by the weight of the material which accumulates in a movable feed receptacle E which receives the fresh feed and also the returned material from the spout 23 and delivers the material to the feed hopper 11. This movable feed receptacle E is suspended by coiled springs 25 from the ceiling or some other stationary support 26, and is provided with one or more discharge spouts 27, each extending downwardly into a tube or collar 28 secured in the top plate of the feed hopper 11. When the fresh feed increases the material accumulates in the feed hopper 11 and rises in the fixed tubes 28 and discharge spouts 27 and accumulates in the movable receptacle E. As the weight of the material in the receptacle E increases the latter descends and as the material therein decreases it rises.

29 is a transverse shaft carrying pulleys 30 with which the movable receptacle E is connected by straps 31. 32 is a pulley also secured to the shaft 29 and connected by a crossed endless belt 33 with a pulley 34 on a horizontal shaft 35 arranged in the casing in front of the automatic deflector D. The belt 33 is provided with a counter weight 36 which tends to turn the shaft 29 in the direction in which it causes the receptacle E to rise. The deflector D is adjusted from the shaft 35 by means of an endless belt or chain 37 which passes around a pulley 38 on the shaft 35 and a pulley 39 at the rear end of the casing. The automatic deflector D is secured to this endless belt or chain 37 by any suitable means, for instance, a thumbscrew 40.

When the movable feed receptacle E descends by the weight of material accumulating therein, as it does when the fresh feed increases to a sufficient extent, it turns the shaft 29 by means of the straps 31 and pulleys 30 in such a direction that the movement of the shaft, which is transmitted to the shaft 35 by the belt 33, moves the deflector D rearwardly, thereby reducing the quantity of material which passes down to the return deflectors 19 in rear of the automatic deflector D and so reduces the volume of material which is returned by the conveyer C, spout 21, elevator 22 and spout 23 to the movable receptacle E. During this descending movement of the receptacle E the counter weight 36 is raised by the preponderating weight of the receptacle E and contents. When a deficiency in the feed of fresh material causes the weight of the feed receptacle and contents to be overbalanced by the counter weight and the tension of the suspension springs, the counter weight descends, thereby raising the feed receptacle and actuating the endless belt 33 in such direction that the automatic deflector is moved forwardly, thereby increasing the quantity of material which passes to the return deflectors 19 and is returned by the conveyer C and connecting parts to the movable receptacle. The material now accumulates again in the feed hopper and in the movable receptacle until the weight of the latter and contents overbalances the counterweight and the tension of the suspension springs, when the deflector is shifted backwardly and the volume of returned material decreased accordingly. The counterweight is so selected as to balance the weights and the resistances which have to be overcome in order to secure the desired automatic action of the deflector D in maintaining a uniform load.

The fixed tubes 28 in the feed hopper 11 into which the discharge spouts 27 of the movable receptacle E extend and in which these spouts move up and down, serve as guides for the movable spouts 27 and also fix the height to which the material can accumulate in the feed hopper, thereby maintaining a column or body of practically uniform height in said hopper.

In the preferred construction of the automatic deflector or cutoff D, which is represented in the drawings, this deflector is composed of two similar hopper-shaped parts 41 arranged on opposite sides of a longitudinal top bar 42 which forms part of the frame or carriage of the deflector, which frame or carriage comprises in addition to the bar 42 longitudinal side bars 43 and front and rear cross bars 44 45. The side bars 43 are provided with grooved wheels 46 which run upon longitudinal rails 47. The endless belt or chain 37 by which the automatic deflector is shifted forwardly or backwardly passes through the space between the two hopper-shaped portions 41 of the deflector underneath the top bar 42 and is secured to the rear cross bar 45 of the frame or carriage by the thumb-nut 40.

The normal position of the automatic deflector or cutoff D can be changed forwardly or backwardly along the endless belt or chain 37, as the nature of the material and other conditions may require, and the number of deflectors 19 which are placed or adjusted to direct material to the return conveyer C can be increased or reduced accordingly.

In the herein described mechanism the variations of the feed of fresh material are compensated for and a predetermined uniform feed is maintained by returning to the feed hopper automatically such a quantity of material which has been treated in the machine as is necessary to make up for the existing deficiency in the feed of fresh material, such returned quantity becoming less in the same measure as the fresh feed increases and greater in the same measure as the fresh feed decreases, while the purified or separated material which is not required to be returned for making up this deficiency in the fresh feed is discharged from the machine without being returned. The material which is returned for augmenting the feed is taken from the rear portion of the sieve and is less pure than the material which passes through the front portion of the sieve. The returned material is again subjected to the separating or purifying operation and is thereby further freed from impurities.

I claim as my invention:

1. In a separating machine, the combination with a separating sieve and a feed mechanism which supplies the same with material to be separated, of variable cutoff means for dividing the material to be returned from the material which is to be discharged, means for adjusting said cutoff means automatically in accordance with the variations in the feed of material to be separated, and means for returning the cut off material to the sieve.

2. In a separating machine, the combination with a separating sieve and its feed hopper, of a movable cutoff device arranged beneath the sieve and operating to divide the material to be returned from the material which is to be discharged, automatic means for adjusting said cutoff device in accordance with the variations in the feed of material to be separated, and means for returning the material so divided off to the feed hopper.

3. In a separating machine, the combination with a separating sieve and its feed hopper, of a cutoff device arranged beneath the sieve and adjustable lengthwise thereof, automatic means for adjusting said cutoff device in accordance with the variations in the feed of material to be separated, and means for returning the material which is cut off by said device to the feed hopper.

4. In a separating machine, the combination with a separating sieve and its feed hopper, of a movable cutoff device arranged beneath the sieve and operating to divide the material to be returned from the material to be discharged, a movable feed receptacle, connecting means between said receptacle and said cutoff device and operating to adjust the latter automatically in accordance with the variations of the feed, and means for returning the cut off material to the sieve.

5. In a separating machine, the combination with a separating sieve and its feed hopper, of a movable cutoff device arranged beneath the sieve and operating to divide the material to be returned from the material to be discharged, a vertically movable feed receptacle which is controlled by the variations in the feed, connecting means between said receptacle and said cutoff device and operating to adjust the latter automatically in accordance with the variations in the feed, and means for returning the material so cut off to the sieve.

6. The combination with a separating sieve, of a stationary feed hopper, a vertically movable feed receptacle which discharges into said hopper, a movable cutoff device arranged beneath said sieve, connecting means between said feed receptacle and said cutoff device, means for supplying the material to be separated to said receptacle, and means for returning the cutoff material to said sieve.

7. The combination with a separating sieve, of a movable cutoff device arranged beneath the same, a stationary feed hopper, a vertically movable feed receptacle adapted to receive the fresh material to be separated and the returned material and to deliver the same to the feed hopper, and connecting means between said movable feed receptacle and said cutoff device and operating to adjust the latter automatically in accordance with the variations in the feed.

8. The combination with a separating sieve, of a movable cutoff device arranged beneath the same, a vertically movable feed receptacle which rises and falls in accordance with the variations in the feed, a shaft which is rotatable in opposite directions and the rotation of which is controlled by the upward or downward movement of said feed receptacle, and means connecting said shaft with said cutoff device and adjusting the latter automatically.

9. The combination with a separating sieve, of a movable cutoff device arranged beneath the same, a vertically movable feed receptacle which rises and falls in accordance with the variations in the feed, a shaft which is rotatable in opposite directions, a connection between said receptacle and said shaft which causes the rotation of said shaft in one direction by the downward movement of said receptacle, a counterweight tending to turn the shaft in the opposite direction, and means connecting said shaft with said cutoff device.

10. The combination with a separating sieve, of a movable cutoff device arranged beneath the sieve and comprising a deflecting hopper and a carriage on which said hopper is mounted, longitudinal rails on which said carriage is capable of back and forth movement, a feed receptacle which moves up or down according to the variations in the feed, and means for communicating motion from said receptacle to said carriage.

11. The combination with a separating sieve, of a stationary feed hopper provided with a tubular guard, a vertically movable feed receptacle arranged above said hopper and having a discharge spout which extends into said guard, a movable cutoff device arranged beneath said sieve, and connecting means between said movable feed receptacle and said cutoff device.

12. The herein described method of subjecting material to a separation on a sieve in a layer of uniform thickness, which consists in augmenting the feed by returning to the same in variable volume a part of the material which has been subjected to the separating action and increasing or decreasing automatically the volume of such returned material as the feed decreases or increases, while the remainder of the material which has been subjected to the separating action is discharged directly and not returned.

Witness my hand in the presence of two subscribing witnesses.

HERBERT S. JEWELL.

Witnesses:
EDWARD C. HARD,
C. B. HORNBECK.